United States Patent
Sato et al.

(10) Patent No.: US 11,327,567 B2
(45) Date of Patent: May 10, 2022

(54) INFORMATION PROCESSING DEVICE AND NON-TRANSITORY COMPUTER READABLE MEDIUM

(71) Applicant: Agama-X Co., Ltd., Tokyo (JP)

(72) Inventors: Masahiro Sato, Tokyo (JP); Kengo Tokuchi, Tokyo (JP)

(73) Assignee: Agama-X Co., Ltd., Tokyo (JP)

( * ) Notice: Subject to any disclaimer, the term of this patent is extended or adjusted under 35 U.S.C. 154(b) by 0 days.

(21) Appl. No.: 16/847,061

(22) Filed: Apr. 13, 2020

(65) Prior Publication Data
US 2021/0173484 A1    Jun. 10, 2021

(30) Foreign Application Priority Data
Dec. 5, 2019    (JP) .............. JP2019-220212

(51) Int. Cl.
*G06F 3/01*    (2006.01)
(52) U.S. Cl.
CPC ........ *G06F 3/015* (2013.01); *G06F 2203/011* (2013.01)
(58) Field of Classification Search
CPC .............................. G06F 3/015; A61N 1/3625
USPC .......................................................... 345/156
See application file for complete search history.

(56) References Cited

U.S. PATENT DOCUMENTS

| | | | |
|---|---|---|---|
| 9,924,271 B2* | 3/2018 | Lai ....................... | H04R 1/1083 |
| 2017/0039045 A1* | 2/2017 | Abrahami ............... | A61P 25/16 |
| 2017/0224218 A1* | 8/2017 | Tanaka ................. | A61B 5/0048 |
| 2017/0311826 A1* | 11/2017 | Narusawa .......... | A61B 5/02444 |
| 2018/0000255 A1* | 1/2018 | Youngblood ........ | A47G 9/0246 |
| 2019/0247650 A1* | 8/2019 | Tran .................... | A61N 1/3625 |

FOREIGN PATENT DOCUMENTS

| | | |
|---|---|---|
| JP | 2015-211705 A | 11/2015 |
| JP | 2016-67922 A | 5/2016 |

* cited by examiner

*Primary Examiner* — Calvin C Ma
(74) *Attorney, Agent, or Firm* — Hoffman Warnick LLC

(57) ABSTRACT

An information processing device includes a processor configured to operate equipment according to biological information indicating an operation item of the equipment in a case where the biological information indicating an operation item of the equipment is measured from a user before the equipment runs, and change an operation item of the equipment in a case where biological information not satisfying a condition regarding a running state of the equipment is measured from the user after the equipment runs.

21 Claims, 5 Drawing Sheets

| ID | STANDARD BRAIN WAVE | OPERATION INFORMATION | USER INFORMATION |
|---|---|---|---|
| 1 | ⁀‿ | TURN ON COOLER OF AIR CONDITIONER | USER A |
| 2 | ∿ | TURN ON COOLER OF AIR CONDITIONER | USER B |
| 3 | ⁀ | TURN OFF COOLER OF AIR CONDITIONER | USER A |
| ••• | ••• | ••• | ••• |

FIG. 4

| ID | STANDARD BRAIN WAVE | OPERATION INFORMATION |
|---|---|---|
| 1 | ⌒ | TURN ON COOLER OF AIR CONDITIONER |
| 2 | ⌒ | TURN OFF COOLER OF AIR CONDITIONER |
| ... | ... | ... |

FIG. 5

| ID | STANDARD BRAIN WAVE | OPERATION INFORMATION | USER INFORMATION |
|---|---|---|---|
| 1 | ⌒ | TURN ON COOLER OF AIR CONDITIONER | USER A |
| 2 | ∿ | TURN ON COOLER OF AIR CONDITIONER | USER B |
| 3 | ⌒ | TURN OFF COOLER OF AIR CONDITIONER | USER A |
| ... | ... | ... | ... |

FIG. 7

| ID | STANDARD BRAIN WAVE | STANDARD BODY TEMPERATURE | OPERATION INFORMATION | USER INFORMATION |
|---|---|---|---|---|
| 1 |  | THRESHOLD OR GREATER | TURN ON COOLER OF AIR CONDITIONER | USER A |
| 2 |  | THRESHOLD OR GREATER | TURN ON COOLER OF AIR CONDITIONER | USER B |
| 3 |  | LESS THAN THRESHOLD | TURN OFF COOLER OF AIR CONDITIONER | USER A |
| ... | ... | ... | ... | ... |

FIG. 8

| ID | STANDARD BRAIN WAVE | STANDARD ENVIRONMENTAL INFORMATION | OPERATION INFORMATION | USER INFORMATION |
|---|---|---|---|---|
| 1 |  | ROOM TEMPERATURE: THRESHOLD OR GREATER | TURN ON COOLER OF AIR CONDITIONER | USER A |
| 2 |  | ROOM TEMPERATURE: THRESHOLD OR GREATER | TURN ON COOLER OF AIR CONDITIONER | USER B |
| 3 |  | ROOM TEMPERATURE: LESS THAN THRESHOLD | TURN OFF COOLER OF AIR CONDITIONER | USER A |
| ... | ... | ... | ... | ... |

INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-220212 filed Dec. 5, 2019.

BACKGROUND

(i) Technical Field

The present disclosure relates to an information processing device and a non-transitory computer readable medium.

(ii) Related Art

It is conceivable to operate equipment by using biological information such as brain waves.

Japanese Unexamined Patent Application Publication No. 2015-211705 describes a device that detects a brain-wave biological signal from the brain waves of a user, detects a surface electromyography biological signal from the surface myoelectric potential of the user, and computes a control signal on the basis of both biological signals.

Japanese Unexamined Patent Application Publication No. 2016-67922 describes a device that acquires the brain waves of the user and selectively operates multiple devices to be operated in accordance with an analysis result obtained by analyzing the brain waves.

SUMMARY

Aspects of non-limiting embodiments of the present disclosure relate to a mechanism for easily changing an operation item of equipment after operating the equipment using biological information.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing device including a processor configured to operate equipment according to biological information indicating an operation item of the equipment in a case where the biological information indicating an operation item of the equipment is measured from a user before the equipment runs, and change an operation item of the equipment in a case where biological information not satisfying a condition regarding a running state of the equipment is measured from the user after the equipment runs.

BRIEF DESCRIPTION OF THE DRAWINGS

An exemplary embodiment of the present disclosure will be described in detail based on the following figures, wherein:

FIG. 4 is a diagram illustrating a management table;

FIG. 5 is a diagram illustrating a management table;

FIG. 7 is a diagram illustrating a management table; and

FIG. 8 is a diagram illustrating a management table.

DETAILED DESCRIPTION

Figure 1:
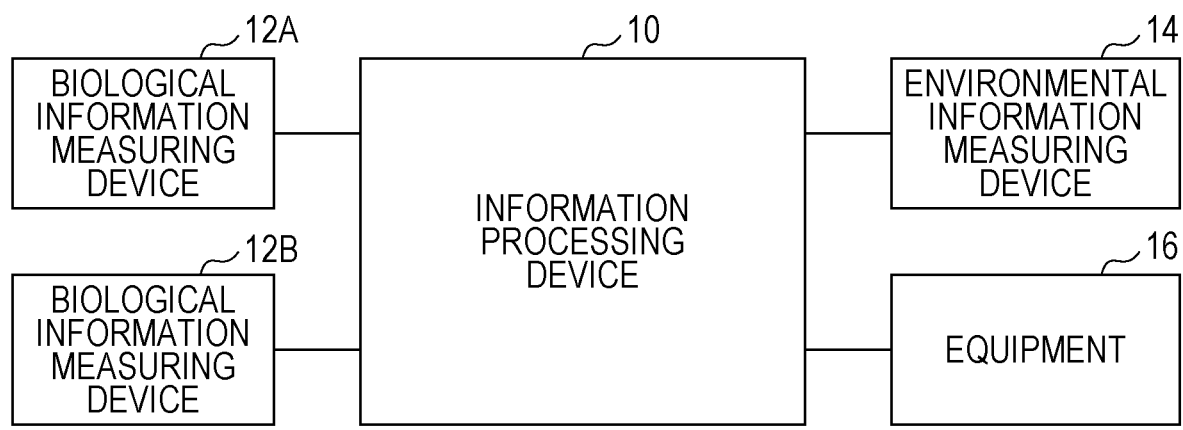
FIG. 1 is a block diagram illustrating a configuration of an information processing system according to an exemplary embodiment.

An information processing system according to the exemplary embodiment will be described with reference to FIG. 1. FIG. 1 illustrates an example of the configuration of the information processing system according to the exemplary embodiment.

The information processing system according to the exemplary embodiment includes an information processing device 10, one or more biological information measuring devices, one or more environmental information measuring devices 14, and one or more pieces of equipment 16. In the example illustrated in FIG. 1, the information processing system includes biological information measuring devices 12A and 12B, but this is merely one example. In the following, the biological information measuring devices 12A and 12B will be referred to as the "biological information measuring device(s) 12" when it is not necessary to distinguish between the biological information measuring devices 12A and 12B. Note that the number of each type of device illustrated in FIG. 1 is merely one example, and the number of each type of device is not limited to the numbers of devices illustrated in FIG. 1. In addition, the information processing system may also include other devices (for example, an external device such as a server) besides the devices illustrated in FIG. 1.

The information processing device 10, the biological information measuring device(s) 12, the environmental information measuring device(s) 14, and the equipment 16 are configured to communicate with other devices and the like. The communication may be wired communication using a cable, or wireless communication. In other words, each device may transmit and receive information with each other through physical connection to other devices and the like using a cable, or transmit and receive information with each other through wireless communication. For the wireless communication, a technology such as short-range wireless communication or Wi-Fi (registered trademark) may be used, for example. Wireless communication according to a standard other than the above may also be used. The short-range wireless communication may be a technology such as Bluetooth (registered trademark), radio-frequency identifier (RFID), or NFC, for example. Each device may also communicate with another device, another sensor, or the like through a communication channel such as a local area network (LAN) or the Internet.

The information processing device 10 is for example a personal computer (hereinafter referred to as "PC"), a tablet PC, a smartphone, a mobile phone, or some other type of device. The information processing device 10 may be a terminal device that the user is able to carry (such as a tablet PC, a smartphone, or a mobile phone, for example), or a device that is installed on a table or the like and used. The information processing device 10 may also be a smart speaker including communication functions, a microphone, and a speaker. The information processing device 10 may be installed indoors (such as on the floor, ceiling, or on a table in a room, for example), or may installed outdoors. Additionally, the information processing device 10 may also be a device capable of movement (for example, a self-propelled device).

The biological information measuring devices 12 include components such as sensors and electrodes, and are configured to measure biological information about a user. Each biological information measuring device 12 may measure a different type of biological information. Obviously, some or all of the biological information measuring devices 12 may also be configured to measure the same type of biological information. In addition, each biological information measuring device 12 may be configured to measure a single type of biological information or multiple types of biological information.

Each biological information measuring device 12 transmits biological information measured by itself to the information processing device 10. Each biological information measuring device 12 may transmit the biological information to the information processing device 10 every time the biological information is measured, or each biological information measuring device 12 may store the biological information and transmit the biological information to the information processing device 10 at predetermined time intervals or transmit the biological information to the information processing device 10 at a timing specified by the user. Also, each biological information measuring device 12 may receive biological information measured by another biological information measuring device 12 from the other biological information measuring device 12, and transmit the biological information measured by itself together with the biological information measured by the other biological information measuring device 12 to the information processing device 10.

Each biological information measuring device 12 may also analyze the biological information measured by itself or another biological information measuring device, and transmit information indicating the analysis result to the information processing device 10. For example, each biological information measuring device 12 may include a processor, and the processor may analyze the biological information. Obviously, such analysis may also be performed by the information processing device 10.

The biological information measuring device 12 may include a battery and be driven by power supplied from the battery, or be driven by receiving a supply of power from the information processing device 10.

The biological information measuring device 12 may also be a wearable device that is entirely worn on the user and measures biological information. For example, the biological information measuring device 12 may be a device worn on the user's head, a bearable device worn on the user's ear, a device worn on a part of the body such as the user's arm, hand, wrist, or finger (such as a wristwatch-style device for example), a device worn around the user's neck, or a device worn on a part of the body such as the user's torso or leg.

The biological information is any of various types of physiological information and anatomical information produced by the living body of the user. As a conceptual category, biological information includes information such as information indicating the activity of the brain (such as brain waves, the quantity of cerebral blood flow, or a cerebral magnetic field signal, for example), pulse frequency, blood pressure, heart rate, an electrocardiogram waveform, a myoelectric waveform, eye movement, body temperature, perspiration, line of sight, speech, and user movement, for example. The above biological information is merely an example, and other physiological information and anatomical information may also be used as the biological information. The biological information measuring device 12 may measure one type or multiple types of biological information from among the above types of biological information.

Additionally, the conceptual category of biological information includes bioelectric potential information indicating an electric potential measured from a living body. As a conceptual category, bioelectric potential information includes information such as brain waves obtained as a result of measuring tiny electric currents produced in association with brain activity, an electrocardiogram obtained as a result of measuring tiny electric currents produced in association with the pumping action of the heart, an electromyogram obtained as a result of measuring tiny electric currents produced in association with muscle activity, and electrodermal activity obtained as a result of measuring tiny electric currents occurring in the skin, for example. The above bioelectric potential information is merely an example, and bioelectric potential information other than the above may also be used.

The information processing device 10 receives biological information from the biological information measuring device 12 and performs operations such as analyzing the biological information, storing the biological information, outputting the biological information, storing information indicating a result of analyzing the biological information, and outputting information indicating a result of analyzing the biological information. Obviously, the analysis of the biological information may also be performed by the biological information measuring device 12. Outputting the biological information means displaying the biological information or outputting the biological information as sound information, for example. Outputting information indicating a result of analyzing the biological information means displaying information indicating an analysis result or outputting an analysis result as sound information, for example. The information processing device 10 may also transmit information indicating the biological information and the analysis result to another device.

The information processing device 10 may include one or multiple biological information measuring devices 12. In other words, one or multiple biological information measuring devices 12 may be incorporated into the information processing device 10 to form a single device. The entirety of the information processing device 10 including the one or more biological information measuring devices 12 may also be worn on the user and measure biological information. In other words, the information processing device 10 may also be a wearable device. For example, the information processing device 10 may be a device worn on the user's head, a bearable device worn on the user's ear, a device worn on a part of the body such as the user's arm, hand, wrist, or finger (such as a wristwatch-style device), a device worn around the user's neck, or a device worn on a part of the body such as the user's torso or leg.

The information processing device 10 and the biological information measuring device 12 may also be separate devices. For example, the information processing device 10 may be a smart speaker, and the biological information measuring device 12 may be a wearable device worn on the user.

The environmental information measuring device 14 is configured to measure environmental information related to the environment surrounding the user and the environmental information measuring device 14. For example, the environmental information measuring device 14 is a device such as a camera that takes images, a microphone that collects sound, a temperature sensor that measures temperature, a humidity sensor that measures humidity, an odor sensor that measures odors, an illuminance sensor that measures brightness, an infrared sensor, or a presence sensor. One or more of the above sensors may be included in the information processing system as the environmental information measuring device 14.

For example, an image of the surroundings of the information processing device 10 or another place is taken by a camera, and image data expressing the surroundings or image data expressing the other place is generated. The image data may be moving image data or still image data. Image data taken by the camera corresponds to one example of environmental information related to the environment included in the image-taking range of the camera. Also, image data expressing the user that is generated by taking an image of the user with the camera corresponds to one example of biological information about the user. For example, characteristics such as user motion or the user's body type detected from the image data corresponds to one example of biological information about the user. In this sense, the camera corresponds to one example of the biological information measuring device 12 that measures biological information about the user.

Also, sounds around a microphone (for example, a person's speech and other sounds) are input into the microphone, and sound data is generated by the microphone. Sound data expressing the sound input into the microphone corresponds to one example of environmental information related to the environment surrounding the microphone. Also, sound data expressing the user's speech input into the microphone corresponds to one example of biological information about the user. In this sense, the microphone corresponds to one example of the biological information measuring device 12 that measures biological information about the user.

Likewise, data measured by sensors such as a temperature sensor, a humidity sensor, an odor sensor, an illuminance sensor, an infrared sensor, and a presence sensor corresponds to one example of environmental information. Also, data measured from the user by the above sensors corresponds to one example of biological information about the user. In this sense, the above sensors correspond to one example of the biological information measuring device 12 that measures biological information about the user.

The environmental information may also include information such as information indicating the size of the room where the user is present, information indicating the size of the room where the equipment is installed, and information indicating the number of windows provided in the room. Additionally, the environmental information is not limited to information measured by the environmental information measuring device 14, and may also be information determined in advance or information measured in advance.

Note that one or multiple environmental information measuring devices 14 may be included in the information processing device 10.

The equipment 16 is a device such as a PC, a tablet PC, a smartphone, a mobile phone, a robot (such as a humanoid robot, a non-humanoid animal robot, a cleaning robot, or some other type of robot, for example), a projector, a display device such as a liquid crystal display, a recording device, a playback device, an imaging device such as a camera, a refrigerator, a rice cooker, a microwave oven, a coffee maker, a vacuum cleaner, a washing machine, an air conditioner, lighting equipment, a clock, a surveillance camera, an automobile, a motorcycle, an aircraft (such as an unmanned aerial vehicle (for example, a drone)), a game console, a gas stove, a toilet seat with a bidet function, a ventilation fan, a doorbell, an entrance monitor, an elevator, a door, a window, or any of various types of sensing equipment (such as a temperature sensor, a humidity sensor, a voltage sensor, or a current sensor), for example. Equipment in general may also be included in the conceptual category of the equipment 16. For example, information equipment, video equipment, audio equipment, and other types of equipment may be included in the category of the equipment 16 according to the exemplary embodiment.

The equipment 16 includes a communication device that acts as a communication interface, a storage device that stores data, and a processor that controls the operation of the equipment 16. The equipment 16 may also include a user interface. The equipment 16 may also transmit equipment identification information for identifying the equipment 16 itself to the information processing device 10. For example, the equipment identification information is information such as an ID, a name, a serial number, or an address (such as a MAC address or an IP address for example) of the equipment 16.

Figure 2:
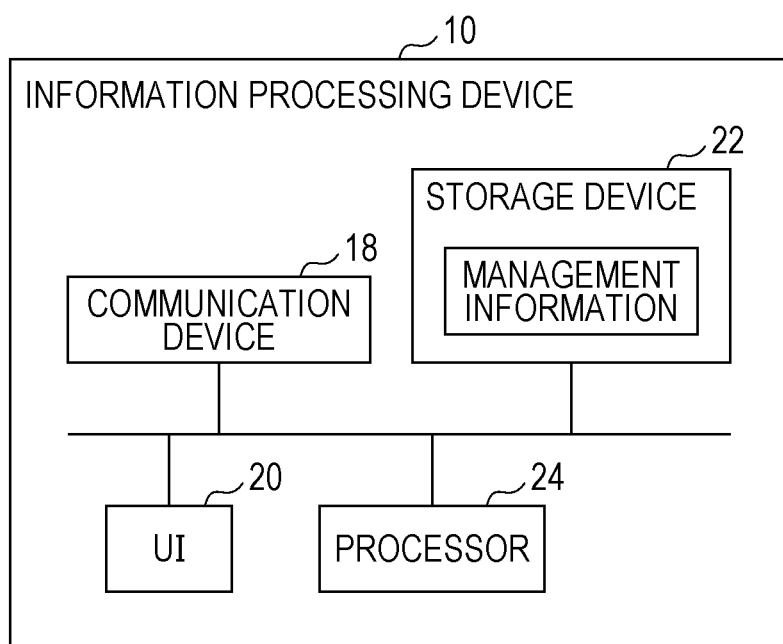
FIG. 2 is a block diagram illustrating a configuration of an information processing device according to the exemplary embodiment.

Hereinafter, FIG. 2 will be referenced to describe the configuration of the information processing device 10 in detail. FIG. 2 illustrates an example of the configuration of the information processing device 10.

The information processing device 10 includes a communication device 18, a UI 20, a storage device 22, and a processor 24, for example. The information processing device 10 may also include components other than the above.

The communication device 18 is a communication interface, and has a function of transmitting data to other devices and a function of receiving data transmitted from other devices. The communication device 18 may have a wireless communication function, and may also have a wired communication function. The communication device 18 may communicate with another device by using short-range wireless communication for example, or communicate with another device through a communication channel such as a LAN or the Internet. For example, the communication device 18 receives biological information transmitted from the biological information measuring device 12. The communication device 18 may also transmit control information for controlling the operation of the biological information measuring device 12 to the biological information measuring device 12. In addition, the communication device 18 receives environmental information transmitted from the environmental information measuring device 14. The communication device 18 may also transmit control information for controlling the operation of the environmental information measuring device 14 to the environmental information measuring device 14. In addition, the communication device 18 transmits control information for controlling the operation of the equipment 16 to the equipment 16. The communication device 18 may also receive information transmitted from the equipment 16.

The UI 20 is a user interface, and includes a display device and an operation device. The display device is a device such as a liquid crystal display or an EL display. The operation device is a device such as a keyboard, input keys, or a control panel. The UI 20 may be a UI such as a touch panel combining a display device with an operation device.

In addition, a microphone may also be included in the UI 20, and a speaker that emits sound may also be included in the UI 20.

The storage device 22 is a device that establishes one or multiple storage areas that store various types of data. For example, the storage device 22 is a hard disk drive, any of various types of memory (such as RAM, DRAM, and ROM, for example), another type of storage device (such as an optical disc, for example), or a combination of the above. One or more storage devices 22 are included in the information processing device 10.

Management information is stored in the storage device 22. The management information is information for specifying an operation item of the equipment 16 on the basis of the biological information measured from the user. For example, predetermined standard biological information and operation information indicating an operation item of the equipment 16 are associated with each other and registered in the management information in advance. The standard biological information may be biological information that is anticipated to occur in the user who performs an operation associated with the standard biological information, or biological information that is anticipated to occur in the user who requests the execution of the operation. The standard biological information may also be considered to be biological information corresponding to an operation item of the equipment 16. The standard biological information and the operation information may be associated with each other and registered in the management information for each user.

In the management information, operation information related to an operation item regarding a power state of the equipment 16 may be registered, operation information related to an operation item regarding a function level of the equipment 16 may be registered, or both operation information related to an operation item regarding the power and operation information related to an operation item regarding a function level may be registered.

The operation item regarding the power state of the equipment 16 is an operation of turning the equipment 16 on or off. The operation information related to the operation item regarding the power state is information indicating an operation of turning the equipment 16 on or off. The biological information associated with the operation information related to the operation item regarding the power state may be considered to be biological information corresponding to turning the equipment 16 on or off. Operation information related to the operation item regarding the power state of the equipment 16 and standard biological information may be associated with each other and registered in the management information for each user.

The operation item regarding a function level of the equipment 16 is an operation of setting a function level of the equipment 16. The operation information related to the operation item regarding a function level is information indicating an operation of setting a function level of the equipment 16. The biological information associated with the operation information related to the operation item regarding a function level may be considered to be biological information corresponding to a function level of the equipment 16. Operation information related to the operation item regarding a function level of the equipment 16 and standard biological information may be associated with each other and registered in the management information for each user.

A function level is a level related to the performance or output of the equipment 16, for example. To give specific examples, the set temperature of an air conditioner, the amount of airflow of an air conditioner, the direction of airflow of an air conditioner, the activation or deactivation of a dehumidifier function of an air conditioner, the brightness of a display device, the brightness of a lighting device, the volume of a speaker, the movement speed of a self-propelled device (such as a robot or a self-propelled vacuum cleaner, for example), settings in devices such as an imaging device, a recording device, and a playback device, settings in devices such as a refrigerator, a rice cooker, and a microwave oven, settings in any of various types of sensing equipment, and the like correspond to examples of function levels. However, the above are merely an example, and set values and the like other than the above may also be function levels.

The processor 24 is configured to acquire biological information about the user and output an instruction for operating the equipment 16 in accordance with the biological information.

For example, when biological information from the user is measured by the biological information measuring device 12, the biological information is transmitted from the biological information measuring device 12 to the information processing device 10. The processor 24 receives the biological information and specifies an operation item of the equipment 16 on the basis of the biological information. The processor 24 operates the equipment 16 by transmitting control information including operation information indicating the specified operation item to the equipment 16. The equipment 16 receiving the control information operates in accordance with the control information. Note that the process of specifying an operation item of the equipment 16 on the basis of biological information does not have to be performed by the information processing device 10, and may also be performed by another device such as a server, or by the biological information measuring device 12. In this case, operation information indicating the specified operation item is transmitted from the other device or the biological information measuring device 12 to the information processing device 10, and the processor 24 receives the operation information.

For example, the processor 24 compares biological information measured from the user to each piece of standard biological information registered in the management information above, and searches for standard biological information whose difference from the biological information is inside a tolerance. The processor 24 specifies the operation item of the equipment 16 associated with the standard biological information returned by the search. With this arrangement, the equipment 16 to be operated is specified, and the operation item of the equipment 16 is specified. The tolerance is predetermined. The tolerance may also be changed by the user. The tolerance may also be determined for each user.

In the case where the search returns multiple pieces of standard biological information whose difference from the biological information measured from the user is inside the tolerance, the processor 24 specifies the standard biological information having the smallest difference from the biological information from among the multiple pieces of standard biological information. The processor 24 specifies the operation item of the equipment 16 associated with the specified standard biological information.

The standard biological information may be information indicating a characteristic component of the biological information. In this case, the processor 24 may extract the characteristic component from the biological information measured from the user, and search for standard biological information having a component whose difference from the extracted component is inside a tolerance. For example, in the case where brain waves are used as the biological information, the processor 24 may estimate the operation item expressed by brain waves by extracting a characteristic component from measured brain waves, and analyzing the component.

For example, a brain-machine interface may be constructed by a biological information measuring device 12 that measures the activity of the brain and the information processing device 10. The brain-machine interface may be invasive or non-invasive. In this case, the processor 24 operates the equipment 16 on the basis of the activity (such as brain waves for example) of the user's brain. To operate the equipment 16, the processor 24 may extract a characteristic component from brain waves, and operate the equipment 16 on the basis of the extracted component. To extract a characteristic component from brain waves, techniques such as a fast Fourier transform (FFT), a wavelet transform (WT), a time-frequency distribution (TFD), eigenvector methods (EM), or an autoregressive model (ARM) may be used. Also, as a method of linking brain waves to an operation item of the equipment 16 using feature vectors obtained by feature extraction, for example, techniques such as independent component analysis (ICA), k-means clustering, a support vector machine (SVM), or a convolutional neural network may be used.

In addition, the processor 24 may also be configured to receive equipment identification information transmitted from the equipment 16 and identify the equipment 16. For example, the processor 24 may transmit an acquisition request for equipment identification information to the equipment 16, and acquire equipment identification information transmitted from the equipment 16 in response to the acquisition request. Also, equipment identification information may be transmitted to the information processing device 10 from the equipment 16 made capable of communicating with the information processing device 10 by being connected to the information processing device 10 or the like, and the processor 24 may receive the equipment identification information transmitted in this way.

In addition, the processor 24 may also be configured to control the operation of each unit of the information processing device 10. The processor 24 may include memory.

Also, in the case where biological information indicating an operation item of the equipment is measured from the user before the equipment 16 runs, the processor 24 operates the equipment 16 by transmitting control information including operation information indicating the operation item of the equipment 16 to the equipment 16. In the case where biological information not satisfying a condition regarding the running state of the equipment 16 is measured from the user after the equipment 16 runs, the processor 24 changes the operation item of the equipment 16. For example, the processor 24 changes the operation item of the equipment 16 such that biological information satisfying a condition regarding the running state of the equipment 16 is measured from the user.

The condition regarding the running state is a condition for determining whether or not the user is satisfied with the running state of the equipment 16. Biological information not satisfying the condition regarding the running state is biological information indicating that the user is not satisfied with the running state of the equipment 16, and is biological information indicating a state or emotion or the user such as discomfort, stress, or negativity, for example. Biological information satisfying the condition regarding the running state is biological information indicating that the user is satisfied with the running state of the equipment 16, and is biological information indicating a state or emotion or the user such as comfort, relaxation, joy, or positivity, for example. The processor 24 estimates a state or emotion of the user on the basis of biological information measured from the user after the equipment 16 runs. For example, information indicating a state or emotion of the user is associated with biological information expected to be produced by the user when the user is in the state or feeling the emotion, and stored in advance in the storage device 22 of the information processing device 10, or in another device such as a server. By referencing the association, the processor 24 estimates a state or emotion of the user on the basis of biological information measured from the user. Note that the process of estimating a state or emotion of the user does not have to be performed by the information processing device 10, and may also be performed by another device such as a server, or by the biological information measuring device 12. In this case, information indicating a result of the estimation is transmitted from the other device or the biological information measuring device 12 to the information processing device 10, and the processor 24 receives the information indicating the result of the estimation. The processor 24 or another device may also estimate a state or emotion of the user by using publicly available technology.

For example, in the case where biological information indicating an operation item of turning on a heater of an air conditioner acting as one example of the equipment 16 is measured from the user before the heater of the air conditioner runs (for example, before the heater turns on), the processor 24 turns on the heater of the air conditioner. Also, in the case where biological information measured from the user indicates a function level of the heater (for example, a set temperature of the heater), the processor 24 sets the function level of the heater (for example, the set temperature of the heater) according to the biological information. In the case where biological information not satisfying a condition regarding the running state of the air conditioner (for example, biological information indicating a state or emotion such as feeling uncomfortable or hot) is measured from the user after the heater of the air conditioner runs, the processor 24 changes the operation item of the air conditioner. For example, the processor 24 changes the operation item of the air conditioner such that biological information satisfying a condition regarding the running state of the air conditioner is measured from the user. In this example, because biological information indicating a state or emotion such as feeling uncomfortable or hot is measured from the user while the heater of the air conditioner is running, the processor 24 may turn off the heater of the air conditioner or lower the set temperature of the heater to address the feeling of discomfort or being hot. For example, the processor 24 may change the operation item of the equipment 16 such that the equipment 16 acts in the opposite manner of the action of the equipment 16 in the current running state, change the operation item of the equipment 16 such that the action of the equipment 16 is weakened, or change the operation item of the equipment 16 such that the action of the equipment 16 is strengthened.

In the case where biological information not satisfying a condition regarding the running state of the equipment 16 is measured before the equipment 16 runs, and biological information indicating an operation item of the equipment 16 is measured from the user within a predetermined amount of time from the point in time when the biological information not satisfying the condition is measured, the processor 24 may operate the equipment 16 by transmitting control information including operation information indicating an operation item of the equipment 16 to the equipment 16. The biological information not satisfying a condition regarding the running state of the equipment 16 may be considered to be pre-information before the biological information indicating an operation item of the equipment 16 is measured. In the case where biological information not satisfying a condition regarding the running state of the equipment 16 is measured from the user, the user estimates that the user is not satisfied with the running state of the equipment 16. In the case where biological information indicating an operation item of the equipment 16 is measured from the user within a predetermined amount of time from the point in time when the biological information is measured, it is estimated that the user wants to operate the equipment 16 or has a request of wanting to change the operation item to address the current circumstances. Consequently, the processor 24 operates the equipment 16 by transmitting control information including operation information indicating an operation item of the equipment 16 to the equipment 16.

In the case where biological information not satisfying a condition regarding the running state of the equipment 16 is measured before the equipment 16 runs, and biological information indicating an operation item of the equipment 16 is not measured from the user within a predetermined amount of time from the point in time when the biological information not satisfying the condition is measured, the processor 24 does not have to operate the equipment 16. In other words, the processor 24 maintains the current state of the equipment 16. Even in the case where biological information not satisfying a condition regarding the running state of the equipment 16 is measured from the user, if biological information indicating an operation item of the equipment 16 is not measured from the user within a predetermined amount of time from the point in time when the biological information is measured, it is estimated that the user does not want to operate the equipment 16 or does not have a request of wanting to change the operation item. Consequently, the processor 24 does not operate the equipment 16.

In the case where biological information not satisfying a condition regarding the running state of the equipment 16 is measured from the user after the equipment 16 runs, the processor 24 may change the operation item of the equipment 16 according to at least one of other biological information different from the biological information indicating an operation item of the equipment 16 and environmental information.

For example, in the case where biological information not satisfying a condition regarding the running state of the air conditioner (for example, biological information indicating a state or emotion such as feeling uncomfortable or hot) is measured from the user after the cooler of the air conditioner acting as one example of the equipment 16 runs, the processor 24 changes the operation item of the air conditioner according to the user's body temperature, which is one example of other biological information. For example, in the case where the body temperature of the user is equal to or greater than a threshold of body temperature, the processor 24 lowers the set temperature of the cooler of the air conditioner. As another example, the processor 24 may also change the operation item of the air conditioner according to the room temperature, which is one example of environmental information. For example, in the case where the room temperature is equal to or greater than a threshold of room temperature, the processor 24 lowers the set temperature of the cooler of the air conditioner. As yet another example, in the case where the body temperature of the user is equal to or greater than a threshold of body temperature and the room temperature is equal to or greater than a threshold of room temperature, the processor 24 may lower the set temperature of the cooler of the air conditioner. Information indicating the size of the room, information indicating the number of windows provided in the room, and the like may also be used as the environmental information, for example.

The condition regarding the running state of the equipment 16 may also be determined on the basis of at least one of movement by the user and the environment where the user is present. Movement by the user is detected by an imaging device such as a camera, or any of various types of sensors, for example. The environment where the user is present is measured by the environmental information measuring device 14.

For example, the processor 24 changes the condition regarding the running state of the equipment 16 according to the amount of movement by the user. For example, in the case where the cooler of the air conditioner acting as one example of the equipment 16 is running, the processor 24 sets the condition when the amount of movement by the user is equal to or greater than a threshold (for example, when the user is running) to a condition whereby the user is more readily determined to be in a state or experiencing an emotion of feeling uncomfortable or hot than the condition when the amount of movement by the user is less than the threshold (for example, when the user is still). With this arrangement, in the case where the amount of movement by the user is equal to or greater than the threshold, the user is more readily determined to be in a state or experiencing an emotion of feeling uncomfortable or hot compared to the case where the amount of movement by the user is less than the threshold.

As another example, in the case where the heater of the air conditioner acting as one example of the equipment 16 is running, the processor 24 sets the condition when the amount of movement by the user is less than a threshold to a condition whereby the user is more readily determined to be in a state or experiencing an emotion of feeling uncomfortable or cold than the condition when the amount of movement by the user is equal to or greater than the threshold. With this arrangement, in the case where the amount of movement by the user is less than the threshold, the user is more readily determined to be in a state or experiencing an emotion of feeling uncomfortable or cold compared to the case where the amount of movement by the user is equal to or greater than the threshold.

As another example, in the case where the cooler of the air conditioner acting as one example of the equipment 16 is running, the processor 24 sets the condition when the room temperature is equal to or greater than a threshold to a condition whereby the user is more readily determined to be in a state or experiencing an emotion of feeling uncomfortable or hot than the condition when the room temperature is less than the threshold. With this arrangement, in the case where the room temperature is equal to or greater than the threshold, the user is more readily determined to be in a state or experiencing an emotion of feeling uncomfortable or hot compared to the case where the room temperature is less than the threshold.

As another example, in the case where the heater of the air conditioner acting as one example of the equipment 16 is running, the processor 24 sets the condition when the room temperature is less than a threshold to a condition whereby the user is more readily determined to be in a state or experiencing an emotion of feeling uncomfortable or cold than the condition when the room temperature is equal to or greater than the threshold. With this arrangement, in the case where the room temperature is less than the threshold, the user is more readily determined to be in a state or experiencing an emotion of feeling uncomfortable or cold compared to the case where the room temperature is equal to or greater than the threshold.

As yet another example, the processor 24 may also change the condition regarding the running state of the equipment 16 according to the combination of the movement by the user and the environment where the user is present.

For example, in the case where the cooler of the air conditioner acting as one example of the equipment 16 is running, the processor 24 sets the condition when the amount of movement by the user is equal to or greater than a threshold and the room temperature is also equal to or greater than a threshold to a condition whereby the user is more readily determined to be in a state or experiencing an emotion of feeling uncomfortable or hot than the condition otherwise.

Note that the condition regarding the running state of the equipment 16 may be determined by the processor 24, or determined by another device other than the information processing device 10 (such as a server for example).

Figure 3:
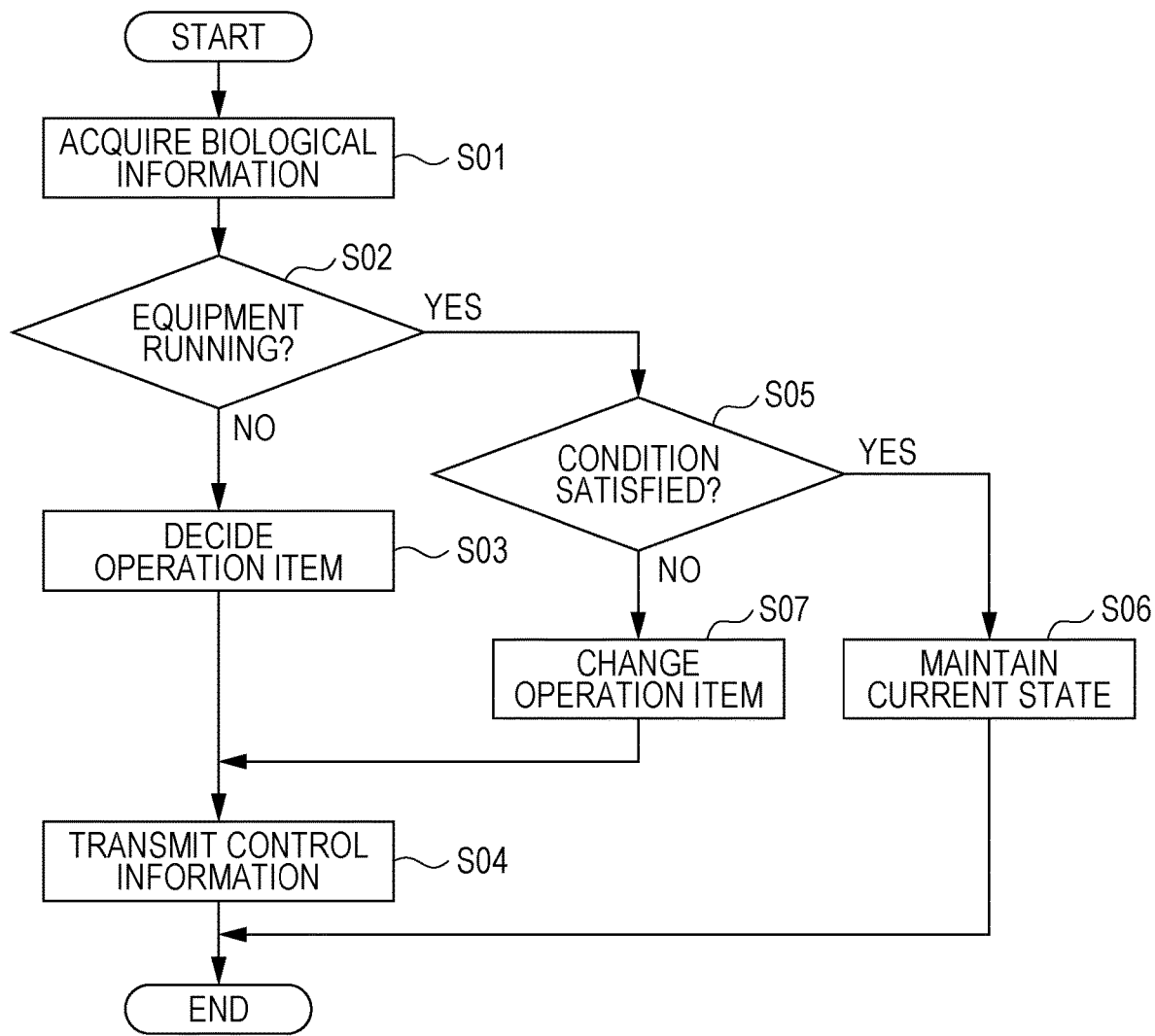
FIG. 3 is a diagram illustrating a flowchart that illustrates processes by the information processing device according to the exemplary embodiment.

Hereinafter, FIG. 3 will be referenced to describe a flow of processes by the information processing device 10. FIG. 3 illustrates a flowchart illustrating a flow of processes by the information processing device 10.

Biological information about the user is measured by the biological information measuring device 12. The biological information measured by the biological information measuring device 12 is transmitted to the information processing device 10, and the processor 24 acquires the biological information (S01). Note that environmental information may also be measured by the environmental information measuring device 14. The environmental information measured by the environmental information measuring device 14 is transmitted to the information processing device 10, and the processor 24 acquires the environmental information.

In the case where the equipment 16 is not running (S02, No), the processor 24 references the management information stored in the storage device 22 to decide an operation item of the equipment 16 on the basis of the biological information measured from the user (S03).

Next, the processor 24 transmits control information including operation information indicating the operation item decided in step S03 to the equipment 16 (S04). With this arrangement, the processor 24 operates the equipment 16. The equipment 16 operates in accordance with the control information. Note that in the case where an operation item is not decided in step S03, the processor 24 does not operate the equipment 16.

In the case where the equipment 16 is already running (S02, Yes), the processor 24 determines whether or not the biological information measured from the user satisfies a condition regarding the running state of the equipment 16 (S05).

In the case where the biological information measured from the user satisfies the condition regarding the running state of the equipment 16 (S05, Yes), the processor 24 maintains the current state of the equipment 16 (S06). In other words, the processor 24 does not change the operation item of the equipment 16.

In the case where biological information satisfying the condition regarding the running state of the equipment 16 is measured from the user, the processor 24 may also store the biological information satisfying the condition in the storage device 22. For example, the processor 24 causes the storage device 22 to store biological information satisfying the condition for each user. With this arrangement, the biological information when the user is satisfied with the running state is stored in the storage device 22. Note that the biological information may also be stored in another device other than the information processing device 10 (such as a server for example). The biological information may also be analyzed.

In the case where the biological information measured from the user does not satisfy the condition regarding the running state of the equipment 16 (S05, No), the processor 24 changes the operation item of the equipment 16 (S07). For example, the processor 24 changes the operation item of the equipment 16 such that biological information measured from the user satisfies the condition. The processor 24 transmits control information including operation information indicating the changed operation item to the equipment 16. With this arrangement, the processor 24 changes the operation item of the equipment 16. The equipment 16 operates in accordance with the changed operation item.

In the case of changing the operation item of the equipment 16, the processor 24 may also notify the user about the change of the operation item. For example, the processor 24 may cause the UI 20 to display a message indicating the change of the operation item of the equipment 16 or emit the message as sound, or transmit the message to a terminal device of the user. The message may include a message indicating the operation item after the change and a message indicating the operation item before the change.

The processor 24 may also change the operation item of the equipment 16 in the case where agreement is obtained from the user receiving the notification. The user may operate the UI 20 to input information indicating agreement with the change of the operation item into the information processing device 10, or input information indicating agreement with the change of the operation item into the information processing device 10 by biological information measured by the biological information measuring device 12 or the environmental information measuring device 14. For example, the processor 24 changes the operation item of the equipment 16 in the case where biological information (such as a brain wave for example) indicating agreement is measured from the user.

Hereinafter, a specific example of the management information will be described.

FIG. 4 illustrates an example of a management table as one example of the management information. The data in the management table is stored in the storage device 22. The data in the management table may also be stored in another device other than the information processing device 10 (such as a server for example), without being stored in the storage device 22.

In the management table, an ID, a standard brain wave, an operation information indicating an operation item of the equipment 16 are associated with each other in advance. The standard brain wave is one example of standard biological information. Herein, a brain wave is used as one example of the standard biological information, but biological information other than brain waves may also be used as the standard biological information.

The ID is information for managing the information registered in the management table.

The standard brain wave is determined by statistical processing, for example, and is a brain wave that is generally anticipated to be occur in the user who performs the operation item associated with the standard brain wave, or a brain wave that is generally anticipated to occur in the user who requests the execution of the operation item.

The standard brain wave may be a brain wave in a specific frequency band, or a brain wave containing brain waves in multiple frequency bands.

The operation information is information including equipment identification information for identifying the equipment 16 to be operated and information indicating the operation item to be performed with respect to the equipment 16. For example, the operation item may be an operation of turning the equipment 16 on or off, or an operation of setting a function level of the equipment 16.

For example, the standard brain wave with the ID "1" is a brain wave expressing an operation item of turning on the cooler of an air conditioner. The standard brain wave with the ID "2" is a brain wave expressing an operation item of turning off the cooler of an air conditioner.

For example, in the case where a brain wave whose difference from the standard brain wave with the ID "1" is inside the tolerance is measured from the user, the processor 24 specifies the operation item of "turn on cooler of air conditioner" associated with the standard brain wave. Additionally, the processor 24 transmits control information including information indicating the operation item of "turn on cooler of air conditioner" to the air conditioner. The air conditioner operates in accordance with the control information. With this arrangement, the cooler of the air conditioner turns on.

Also, the processor 24 may compute a similarity between a brain wave measured from the user and a standard brain wave, and determine whether or not the similarity is a threshold or greater. The threshold is a value corresponding to the tolerance. In the case where the similarity between the brain wave measured from the user and the standard brain wave is the threshold or greater, the processor 24 determines that the brain wave measured from the user and the standard brain wave are similar to each other. In other words, the processor 24 determines that the difference between the brain wave measured from the user and the standard brain wave is inside the tolerance. In the case where a brain wave whose similarity with the standard brain wave with the ID "1" is the threshold or greater is measured from the user, the processor 24 specifies the operation item of "turn on cooler of air conditioner".

The standard biological information and the operation information may be associated with each other and registered in the management table for each user. For example, biological information measured from a user may be registered as standard biological information for the user in the management table.

FIG. 5 illustrates an example of a management table in which specific standard biological information for individual users is registered. In the management table illustrated in FIG. 5, an ID, a standard brain wave given as an example of standard biological information, operation information, and user information are associated with each other. The user information is information for identifying each user (such as a username or a user ID, for example).

The standard brain wave associated with the user information is a brain wave measured from the user when the user indicated by the user information performs the operation item associated with the standard brain wave, or a brain wave measured from the user when the user requests the operation item. Each standard brain wave measured from each user is measured from each user in advance and registered in the management table.

For example, the brain wave of a user A when the user A manually turns on the cooler of the "air conditioner" is measured by the biological information measuring device 12, and the measured brain wave is registered in the management table as a standard brain wave expressing the operation item of "turn on cooler of air conditioner" by the user A.

In this case, the measured standard brain wave of the user A is registered in the management table in association with operation information indicating the operation item of "turn on cooler of air conditioner" and user information for identifying the user A. The registration may be performed using the information processing device 10 or using another device. In the example illustrated in FIG. 5, the information is registered as the information with the ID "1". The same applies to other operations and other users.

Note that the work of registration may also be performed multiple times, and the average of multiple brain waves measured thereby may also be registered as a standard brain wave. For example, the work of the user manually turning on the cooler of the "air conditioner" and the biological information measuring device 12 measuring the brain wave produced from the user A at the time may be performed multiple times, and an average of the multiple brain waves measured thereby may be registered in the management table as a standard brain wave of the user A.

For example, in the case where the user A is logged in to the information processing device 10, and a brain wave whose difference from the standard brain wave with the ID "1" is inside the tolerance is measured from the user A, the processor 24 turns on the cooler of the "air conditioner" by transmitting control information including the operation information corresponding to the ID "1" to the "air conditioner". Described in further detail, if a brain wave is measured by the biological information measuring device 12 while the user A is logged in to the information processing device 10, the processor 24 searches for a standard brain wave that is registered in the management table in association with user information for identifying the logged-in user A. In the example illustrated in FIG. 5, the standard brain wave with the ID "1" and the standard brain wave with the ID "3" are registered in the management table as standard brain waves of the user A, and therefore these standard brain waves are returned by the search. In the case where the difference between the measured brain wave and the standard brain wave with the ID "1" is inside the tolerance, the processor 24 turns on the cooler of the "air conditioner" by transmitting control information including the operation information corresponding to the ID "1" to the "air conditioner". In the case where the difference between the measured brain wave and the standard brain wave with the ID "3" is inside the tolerance, the processor 24 turns off the cooler of the "air conditioner" by transmitting control information including the operation information corresponding to the ID "3" to the "air conditioner".

As another example, in the case where the user operating the equipment 16 is set to "user A" in the information processing device 10, and a brain wave whose difference from the standard brain wave with the ID "1" is inside the tolerance is measured from the user A, the processor 24 may turn on the cooler of the "air conditioner" by transmitting control information including the operation information corresponding to the ID "1" to the "air conditioner". Described in further detail, if a brain wave is measured by the biological information measuring device 12 while the user operating the equipment 16 is set to "user A" in the information processing device 10, the processor 24 searches for a standard brain wave that is registered in the management table in association with user information for identifying the user A who is the user operating the equipment 16. In the case where the difference between the measured brain wave and the standard brain wave with the ID "1" is inside the tolerance, the processor 24 turns on the cooler of the "air conditioner" by transmitting control information including the operation information corresponding to the ID "1" to the "air conditioner". The user operating the equipment 16 is set in the information processing device 10 by the user, for example.

For users other than the user A, each piece of information is likewise registered in the management table similarly to the user A. For example, each piece of information associated with the ID "2" is information related to an operation when a user B turns on the cooler of the "air conditioner". Each piece of information associated with the ID "3" is information related to an operation when the user A turns off the cooler of the "air conditioner".

In the management tables illustrated in FIGS. 4 and 5, operation information indicating operations for turning the equipment 16 on or off is registered, but operation information indicating a function level of the equipment 16 may also be registered in the management table.

Hereinafter, FIG. 5 will be referenced to describe an operation item performed in the case where biological information not satisfying a condition regarding the running state of the equipment 16 is measured from the user after the equipment 16 runs.

For example, in the case where a brain wave whose difference from the standard brain wave with the ID "1" is inside the tolerance is measured from the user A before the air conditioner runs, the processor 24 turns on the cooler of the air conditioner.

In the case where biological information not satisfying a condition regarding the running state of the air conditioner (for example, biological information indicating a state or emotion such as feeling uncomfortable or hot) is measured from the user after the cooler of the air conditioner runs, the processor 24 lowers the set temperature of the cooler of the air conditioner. The amount by which the set temperature is lowered may be predetermined, or the user may be queried and the amount by which to lower the set temperature may be determined according to a response to the query. As another example, in the case where biological information indicating a state or emotion such as feeling cold is measured from the user A, the processor 24 may also turn off the cooler of the air conditioner.

Figure 6:
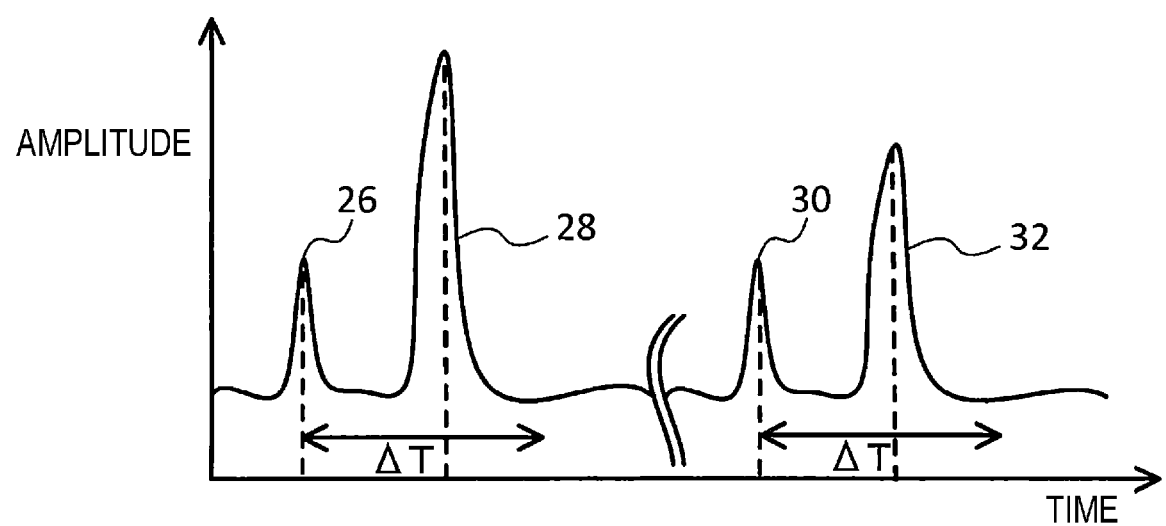
FIG. 6 is a diagram illustrating a brain wave.

Hereinafter, FIG. 6 will be referenced to describe a specific example. FIG. 6 illustrates an example of a brain wave as one example of biological information. The horizontal axis represents time, while the vertical axis represents the amplitude of the brain wave. Although a brain wave is given here as one example of biological information, biological information other than a brain wave may also be used. Also, an air conditioner is assumed to be operated as one example of the equipment 16.

A brain wave 26 is a brain wave not satisfying a condition regarding the running state of the air conditioner before the air conditioner runs.

A brain wave 28 is a brain wave measured from the user A within a predetermined amount of time ΔT from the point in time when the brain wave 26 is measured, and is a brain wave indicating an operation item of the air conditioner. For example, the brain wave 28 is a brain wave whose difference from the standard brain wave with the ID "1" registered in the management table illustrated in FIG. 5 is inside a tolerance. In this case, the processor 24 turns on the cooler of the air conditioner by transmitting control information including operation information indicating the operation item of "turn on cooler of air conditioner" to the air conditioner.

In the case where a brain wave indicating an operation item of the air conditioner is not measured within the amount of time ΔT from the point in time when the brain wave 26 is measured, the processor 24 does not operate the air conditioner.

A brain wave 30 is a brain wave not satisfying a condition regarding the running state of the air conditioner after the cooler of the air conditioner runs. The brain wave 30 is a brain wave measured from the user A at a later point in time than the brain wave 28.

A brain wave 32 is a brain wave measured from the user A within the amount of time ΔT from the point in time when the brain wave 30 is measured, and is a brain wave indicating an operation item of the air conditioner. For example, the brain wave 32 is a brain wave indicating an operation item of lowering the set temperature of the cooler of the air conditioner. In this case, the processor 24 lowers the set temperature of the cooler by transmitting control information including operation information indicating the operation item of "lower set temperature of cooler of air conditioner" to the air conditioner. The amount by which the set temperature is lowered may be predetermined, estimated from the brain wave 32, or separately specified by the user.

As another example, in the case where the brain wave 30 is measured, the processor 24 may also change the operation item of the air conditioner on the basis of other biological information other than a brain wave. For example, in the case where the body temperature of the user A is equal to or greater than a threshold of body temperature, the processor 24 lowers the set temperature of the air conditioner.

As yet another example, in the case where the brain wave 30 is measured, the processor 24 may also change the operation item of the air conditioner on the basis of environmental information. For example, in the case where the room temperature is equal to or greater than a threshold of room temperature, the processor 24 lowers the set temperature of the air conditioner.

FIG. 7 illustrates another example of the management table. The management table illustrated in FIG. 7 is a management table in which standard biological information and operation information are associated with each other and registered for each user. In the example illustrated in FIG. 7, brain waves and body temperature are used as the standard biological information as an example. Consequently, in the management table, an ID, a standard brain wave given as an example of standard biological information, a standard body temperature given as an example of standard biological information, operation information, and user information are associated with each other.

For example, in the case where a brain wave whose difference from the standard brain wave with the ID "1" is inside the tolerance is measured from the user A, and a body temperature equal to or greater than a threshold is measured from the user A, the processor 24 specifies the operation item indicated by the operation information with the ID "1" as the operation item of the equipment 16.

For example, in the case where, before the air conditioner runs, biological information not satisfying a condition regarding the running state of the air conditioner is measured from the user A, a brain wave whose difference from the standard brain wave with the ID "1" is inside the tolerance is measured from the user A, and a body temperature equal to or greater than a threshold is also measured from the user A within the amount of time ΔT from the point in time when the biological information not satisfying the condition is measured, the processor 24 turns on the cooler of the air conditioner by transmitting control information including operation information indicating the operation item with the ID "1" to the air conditioner.

FIG. 8 illustrates another example of the management table. The management table illustrated in FIG. 8 is a management table in which a standard brain wave, standard environmental information, and operation information are associated with each other and registered for each user. A standard brain wave is used as one example of the standard biological information, but other biological information may also be used as the standard biological information.

The standard environmental information is information indicating an environment in which the standard brain wave associated with the standard environmental information is expected to be measured. Room temperature is used as the standard environmental information, but other environmental information may also be used as the standard environmental information.

For example, in the case where a brain wave whose difference from the standard brain wave with the ID "1" is inside the tolerance is measured from the user A, and the room temperature when the brain wave is measured is equal to or greater than a threshold, the processor 24 specifies the operation item indicated by the operation information with the ID "1" as the operation item of the equipment 16. In this way, an operation item of the equipment 16 is measured on the basis of a brain wave measured from the user and the room temperature when the brain wave is measured.

For example, in the case where, before the air conditioner runs, biological information not satisfying a condition regarding the running state of the air conditioner is measured from the user A, a brain wave whose difference from the standard brain wave with the ID "1" is inside the tolerance is measured from the user A, and a room temperature equal to or greater than a threshold is also measured within the amount of time ΔT from the point in time when the biological information not satisfying the condition is measured, the processor 24 turns on the cooler of the air conditioner by transmitting control information including operation information indicating the operation item with the ID "1" to the air conditioner.

Note that in the exemplary embodiment above, the processing by the processor 24 may also be executed by another device (for example, an external device such as a server) other than the information processing device 10, and information indicating a result of the processing may be displayed on the UI 20 or output as sound information.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
a processor configured to
operate equipment according to a standard brain wave information selected from a plurality of standard brain wave information each associated with a respective operation item of the equipment in a case where
a first brain wave information indicating the operation item of the equipment is measured from a user before the equipment runs, and
the standard brain wave information is selected from the plurality of standard brain wave information, the standard brain wave information having a difference from the measured first brain wave information within a predetermined tolerance,
the processor is further configured to
specify the operate item of the equipment to be associated with the selected standard brain wave information, and
change the operation item of the equipment in a case where a second brain wave information representing a state or emotion that the user feels unsatisfied with a condition in which the equipment operates is measured from the user.

2. The information processing device according to claim 1, in a case where, before the equipment runs, the second brain wave information is measured from the user, and a first biological information indicating the operation item of the equipment is measured from the user within a predetermined amount of time from a point in time when the second brain wave information is measured, the processor is configured to operate the equipment according to the biological information, and
in a case where, before the equipment runs, the second brain wave information is measured from the user, and the first biological information indicating the operation item of the equipment is not measured from the user within the predetermined amount of time from the point in time when the second brain wave information is measured, the processor does not operate the equipment.

3. The information processing device according to claim 2, in the case where the second brain wave information is measured from the user before the equipment runs, the processor is configured to change the operation item of the equipment according to at least one of:
a third brain wave information associated with the operation item of the equipment measured from the user within a predetermined amount of time from a point in time when the second brain wave information is measured;
the first biological information indicating the operation item of the equipment and different from the third brain wave information; and
an environmental information.

4. The information processing device according to claim 2, wherein the processor is configured to notify the user of a change in the case of changing the operation item of the equipment.

5. The information processing device according to claim 4, wherein the processor is configured to change the operation item of the equipment in a case where agreement is obtained from the user receiving a notification.

6. The information processing device according to claim 5, wherein the agreement is obtained on a basis of a second biological information from the user.

7. The information processing device according to claim 2, wherein the condition is determined on a basis of at least one of movement by the user and an environment where the user is present.

8. The information processing device according to claim 2, in a case where the second brain wave information is measured from the user, the processor is configured to cause a memory to store the second brain wave information.

9. The information processing device according to claim 1, in a case where the second brain wave information is measured from the user after the equipment runs, the processor is configured to change the operation item of the equipment according to at least one of:
a third brain wave information associated with the operation item of the equipment measured from the user within a predetermined amount of time from a point in time when the second brain wave information is measured;
a first biological information indicating the operation item of the equipment and different from the third brain wave information; and
an environmental information.

10. The information processing device according to claim 9, wherein the processor is configured to notify the user of a change in the case of changing the operation item of the equipment.

11. The information processing device according to claim 10, wherein the processor is configured to change the operation item of the equipment in a case where agreement is obtained from the user receiving a notification.

12. The information processing device according to claim 9, in a case where the second brain wave information is measured from the user, the processor is configured to cause a memory to store the second brain wave information.

13. The information processing device according to claim 1, wherein the processor is configured to notify the user of a change in the case of changing the operation item of the equipment.

14. The information processing device according to claim 13, wherein the processor is configured to change the operation item of the equipment in a case where agreement is obtained from the user receiving a notification.

15. The information processing device according to claim 14, wherein the agreement is obtained on a basis of a second biological information from the user.

16. The information processing device according to claim 1, wherein the condition is determined on a basis of at least one of movement by the user and an environment where the user is present.

17. The information processing device according to claim 1, in a case where the second brain wave information is measured from the user, the processor is configured to cause a memory to store the second brain wave information.

18. The information processing device according to claim 1, wherein the selected standard brain wave information has the smallest difference from the first brain wave information measured from the user, among the plurality of standard brain wave information.

19. The information processing device according to claim 1, wherein the equipment is an air conditioner, and wherein the processor is configured to change the operation item of the air conditioner based on the user's body temperature or a room temperature.

20. A non-transitory computer readable medium storing a program causing a computer to execute a process for processing information, the process comprising:
operating an equipment according to a standard brain wave information selected from a plurality of standard brain wave information each associated with a respective operation item of the equipment, in a case where
a first brain wave information indicating the operation item of the equipment is measured from a user before the equipment runs, and
the standard brain wave information is selected from the plurality of standard brain wave information, the standard brain wave information having a difference from the measured first brain wave information within a predetermined tolerance,
specifying the operate item of the equipment to be associated with the selected standard brain wave information, and
changing the operation item of the equipment in a case where a second brain wave information representing a state or emotion that the user feels unsatisfied with a condition in which the equipment operates is measured from the user.

21. An information processing device comprising:
a processor configured to:
operate equipment according to a first brain wave information indicating an operation item of the equipment in a case where the first brain wave information is measured from a user before the equipment runs, and
change the operation item of the equipment in a case where, after the equipment runs,
a second brain wave information representing a state or emotion that the user feels unsatisfied with a condition in which the equipment operates is measured from the user;
a third brain wave information is measured from the user within a predetermined amount of time from a point in time when the second brain wave information is measured; and
a standard brain wave information is selected from a plurality of standard brain wave information each associated with a respective operation item of the equipment, the selected standard brain wave information having a difference from the third brain wave information within a predetermined tolerance, and
wherein the processor is configured to change the operation item of the equipment according to the selected standard brain wave information associated with the operation item of the equipment.

* * * * *